US012436872B2

(12) United States Patent
Joshi et al.

(10) Patent No.: US 12,436,872 B2
(45) Date of Patent: Oct. 7, 2025

(54) CODE ANALYSIS DEVICE AND CODE ANALYSIS METHOD USING MCDC METHOD

(71) Applicants: HYUNDAI MOTOR COMPANY, Seoul (KR); Kia Corporation, Seoul (KR)

(72) Inventors: Bhimsen Joshi, Telangana (IN); KwangChul Jeong, Seoul (KR); Satya Praveen Ganapathi, Telangana (IN); Ramesh Chitte, Telangana (IN); Lakshmi Manikanta Janjanam, Andra Pradesh (IN); Yong Suk Park, Suwon-si (KR); Sripad Jangam, Telangana (IN)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 198 days.

(21) Appl. No.: 18/373,446

(22) Filed: Sep. 27, 2023

(65) Prior Publication Data
US 2024/0104007 A1    Mar. 28, 2024

(30) Foreign Application Priority Data
Sep. 27, 2022   (IN) .............................. 202211055248

(51) Int. Cl.
   *G06F 11/00*   (2006.01)
   *G06F 11/3668*  (2025.01)
(52) U.S. Cl.
   CPC ...... *G06F 11/3684* (2013.01); *G06F 11/3676* (2013.01)
(58) Field of Classification Search
   CPC ............. G06F 11/3676; G06F 11/3684
   See application file for complete search history.

(56) References Cited

U.S. PATENT DOCUMENTS

| 8,612,938 B2 | 12/2013 | Prasad et al. |
| 9,639,442 B2 | 5/2017 | Selvaraj et al. |
| (Continued) | | |

FOREIGN PATENT DOCUMENTS

| CN | 102323906 B | 1/2014 |
| CN | 104461906 A | 3/2015 |
| (Continued) | | |

OTHER PUBLICATIONS

Halle, Sylvain. Test Suite Generation for Boolean Conditions with Equivalence Class Partitioning. IEEE/ACM 10th I'ntl Conference on FormaliSE [online], [retrieved Mar. 3, 2025]. Retrieved from the Internet <URL: https://ieeexplore.ieee.org/document/9796388> < DOI: 10.1145/3524482.3527659> (Year: 2022).*

(Continued)

*Primary Examiner* — Syed H Hasan
(74) *Attorney, Agent, or Firm* — MORGAN, LEWIS & BOCKIUS LLP

(57) ABSTRACT

A code analysis method includes: converting an expression indicated by a source code to Boolean expression, the expression including n conditions; generating binary expression tree including a plurality of nodes based on the Boolean expression; initializing a flip limit and the number of flips of each node by analyzing whether each node is a leaf node or a parent node; generating a first test case by initialization Boolean values of each of the plurality of parent nodes each of which a name is an operator among the plurality of nodes and two child nodes of the plurality of parent nodes to one of a plurality of valid cases; and generating n test cases by performing a flip on all node having flip feasibility on a path from a root node to a leaf node based on the first test case, and storing the first test and the n test cases.

28 Claims, 15 Drawing Sheets

(56) References Cited

U.S. PATENT DOCUMENTS

2005/0278577 A1* 12/2005 Doong ................ G06F 11/3688
714/38.1
2018/0089058 A1* 3/2018 Anantharam ....... G06F 11/3692
2018/0268015 A1* 9/2018 Sugaberry ......... G06F 16/24575

FOREIGN PATENT DOCUMENTS

| | | | | |
|---|---|---|---|---|
| CN | 108647146 A | | 10/2018 | |
| CN | 110825650 A | * | 2/2020 | .......... G06F 11/3688 |
| JP | 2009-181292 A | | 8/2009 | |

OTHER PUBLICATIONS

Ahishakiye, Faustin. MC/DC Test Cases Generation Based on BDDs. Dependable Software Engineering, SETTA 2021. [online], [retrieved Mar. 3, 2025]. Retrieved from the Internet <URL: https://dl.acm.org/doi/10.1007/978-3-030-91265-9_10> <DOI: 10.1007/978-3-030-91265-9_10> (Year: 2021).*

Kelly J. Hayhurst, et al., "A Practical Tutorial on Modified Condition/ Decision Coverage", National Aeronautics and Space Administration (NASA), Langley Research Center, Hampton, VA, May 2001.

Fan Xin et al., "Test Data Automatic Generation Based on Modified Condition/Decision Coverage Criteria", International Conference on Computer Science and Intelligent Communication (CSIC) 2015, Atlantis Press, pp. 287-290.

Sangharatna Godboley, et al., "Increase in Modified Condition/ Decision Coverage Using Program Code Transformer", 2013 3rd IEEE International Advance Computing Conference (IACC), pp. 1400-1407.

Author Unknown, "Code Coverage seems to indicate conditions that can not be covered.", https://www.ibm.com/support/pages/code-coverage-seems-to-indicate-conditions-that-can-not-be-covered, Year: 2018.

Michael Whalen, et al., "Observable Modified Condition/Decision Coverage", ICSE 2013, San Francisco, CA, pp. 102-111.

Tanay Kanti Paul (Thesis), "Supplementing MCDC-based testing to detect faults in Boolean specification", 2014, 358 pages.

Sonam Tiwari (Thesis), "Automatic Generation of Test Cases for High MCDC Coverage", 2014, 57 pages.

Sunil Yadav, "Conforming to Safety Standard", Vector India Conference 2019, Vector Informatic GmbH, V6.14, Oct. 6, 2017.

* cited by examiner

FIG. 3

| No. | Example Expression | Converted Expression | Conditions (n) | Total States (2ⁿ) | MCDC Cases (n+1) |
|---|---|---|---|---|---|
| 1 | Inp_INT_IGN2Cnf == On && Inp_INT_FrtWprMistSwState == On && Inp_INT_FrtWprInhibitState == On] | C1 && C2 && C3 | 3 | 8 | 4 |
| 2 | ((0Tracinfo.fLongPos >= LONG_POS_ZERO) && (Tracinfo.fLongPo > LONG_POS_MAX)) \|\| Tracinfo.fLatPos > L_PO_FRONT | (C4 && C5) \|\| C6 | 3 | 8 | 4 |
| 3 | (FCLD_LO_PO_MIN <= fRange && fRange < FCLD_LO_PO_MAX)&& (fTheta < FCLDR_FOV_AN_TH) | (C7 && (C8 && C9) | 3 | 8 | 4 |
| 4 | Inp_SKSt == SKSt_Learnt && Inp_CapaSnsrState == CapaSnsrState_Applied && Inp_AllDoors == On && Inp_AllDoorUnlock == Off && (Inp_INT_TerminalCtlGroup == TerminalCtlGroup_On \|\| (Inp_TerminalCtlGroup == TerminalCtlGroup_Acc \|\| Inp_TerminalCtlGroup == TerminalCtlGroup_Ign) && Inp_INT_VehicleSpeed < 5 && (Inp_INT_MTOpState == MTOpState_Applied \|\| Inp_AMTOpState == AMTOpState_Applied \|\| Inp_INT_Pos == On) \|\| Inp_INT_RSPACrakState == On) && (Inp_SmtWelcomePreAuthState == PREAUTH_DRVSIDE \|\| Inp_SmtSigDrPreAuthState == SMRTSLDPREAUTH_DRVSIDE) && Inp_b_DRUn | a && b && c && d && e && (f \|\| ((g \|\| h) && i && (j \|\| k \|\| l)) \|\| m) && (n \|\| o) && p && q | 17 | 131,072 | 18 |

_US 12,436,872 B2_

CODE ANALYSIS DEVICE AND CODE ANALYSIS METHOD USING MCDC METHOD

CROSS-REFERENCE TO RELATED APPLICATION

The present application claims priority to Indian Patent Application No. 202211055248 filed in the Indian Patent Office on Sep. 27, 2022, the entire contents of which is incorporated herein for all purposes by this reference.

BACKGROUND OF THE PRESENT DISCLOSURE

Field of the Present Disclosure

The present disclosure relates to a code analysis method using an MCDC method, and a code analysis method.

Description of Related Art

Today's vehicles contain about 100 million lines of software code, and can be expected to have about 300 million lines of code by 2030. For systems such as autonomous driving, source code testing is becoming more complex. Vehicle/aerospace software test methods such as statement coverage/branch coverage/MCDC coverage are mandated by ISO26262 to improve software quality.

Test cases can be used to test such source code, but if the number of test cases is large, source code analysis may be delayed.

The information disclosed in this Background of the present disclosure section is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing a code analysis device that generates a plurality of test cases satisfying source code coverage in a source code analysis device, and a code analysis method.

A code analysis method in an aspect of the present disclosure is performed by a processor, and includes: converting an expression indicated by a source code to a Boolean expression, the expression including n conditions; generating a binary expression tree including a plurality of nodes based on the Boolean expression; initializing a flip limit and a number of flips of each of the plurality of nodes by analyzing whether each of the plurality of nodes is a leaf node of which a name is an operand or a parent node of which a name is an operator; generating a first test case by initialization Boolean values of each of the plurality of parent nodes each of which a name is an operator among the plurality of nodes and two child nodes of the plurality of parent nodes to one of a plurality of valid cases; and generating n test cases by performing a flip on all node having flip feasibility on a path from a root node to a leaf node of the binary expression tree based on the first test case, and storing the first test and the n test cases, wherein the flip is reversing the Boolean value of each corresponding node among the plurality of nodes, and n is a natural number greater than or equal to 2.

The plurality of valid cases may include: a case that a Boolean value of an AND operator is true and two Boolean values of two operands are true; a case that the Boolean value of the AND operator is false, and one of the Boolean values of the two operands is true and the Boolean value of the other is false; a case that a Boolean value of an OR operator is false and two Boolean values of two operands are false; and a case that when the Boolean value of the OR operator is true, and one of the Boolean values of the two operands is true and the Boolean value of the other is false.

The generating of the binary expression tree may include generating the node data including a name, information on two child nodes, a Boolean value, a flip limit, and the number of flips corresponding to each of the plurality of nodes.

The initializing of the flip limit and the number of flips of each of the plurality of nodes may include: setting the flip limit corresponding to each of the plurality of leaf nodes of which a name is an operand among the plurality of nodes to 1; setting a flip limit of each of the plurality of parent nodes to a sum of the two flip limits for two child nodes thereof; and setting the number of flips of each of the plurality of nodes to 0.

The generating of the n test cases and the storing of the first test case and the n test case may include determining whether a termination condition for the binary expression tree is satisfied, and the termination condition may be satisfied when a number of test cases generated for the binary expression tree is n+1, or the plurality of leaf nodes is flipped at least once.

In response that the processor concludes that the termination condition is satisfied, the code analysis method may further include storing the (n+1) generated test case including the first test case and the n test cases in a storage device.

The code analysis method may further include: in response that the processor concludes that the termination condition is not satisfied, determining whether there is flip feasibility in each of the plurality of node while traversing the plurality of nodes; and determining whether there is a flip feasibility path in the binary expression tree based on the flip feasibility of each of the plurality of nodes.

The code analysis method may further include tree transformation for converting the binary expression tree in response that the processor concludes that there is no the flip feasibility path, wherein the tree transformation may be first tree transformation for flipping a first node that cannot be flipped among the plurality of nodes of the binary expression tree and child nodes of the first node, or second tree transformation for flipping the first node of the binary expression node, child nodes of the first node, and parent nodes of the first node.

The code analysis method may further include: generating a second binary expression tree by converting a first binary expression tree; and determining whether the second binary expression tree satisfies the termination condition.

The determining of whether each of the plurality of nodes has flip feasibility may include determining that a target node of which flip feasibility is to be determined has the flip feasibility in response that a Boolean value of each of a parent node of the target node and two child nodes of the parent node is one of the plurality of valid cases and a number of flips of the target node is less than the flip limit.

The determining of whether there is a flip feasibility path in the binary expression tree may include determining that there is the flip feasibility path in the binary expression tree when all nodes connected by trunk lines from a root node among the plurality of nodes to one of a plurality of leaf nodes among the plurality of nodes are capable of being flipped.

The code analysis method may further include, in response that the processor concludes that there is a flip feasibility path, performing a flip on all nodes included in the flip feasibility path and updating the binary expression tree based on the flip.

The code analysis method may further include generating a test case indicating a result of the flip.

The code analysis method may further include: generating a fourth binary expression tree by performing the flip on a third binary expression tree; and determining whether the fourth binary expression tree satisfies the termination condition.

A code analysis device according another feature of the present invention includes: an input/output device receiving a source code; a processor that generates a plurality of test cases for an expression represented by the source code and analyzes codes, the expression including n conditions; and a storage device storing the plurality of test cases, wherein the processor may include a controller that converts an expression to a Boolean expression, generates a binary expression tree including a plurality of nodes based on the Boolean expression, initialize a flip limit and a number of flips of each of the plurality of nodes by analyzing whether each of the plurality of nodes is a leaf node with an operand as a name thereof or an operator node with an operator as a name thereof, generates a first test case by initializing Boolean values of each of a plurality of parent nodes, of which a name is an operator among the plurality of nodes, and two child nodes of each of the plurality of parent nodes with one of a plurality of valid cases, generates n test cases by performing a flip on all nodes having flip feasibility on a path from a root node to a leaf node of the binary expression tree based on the first test case, and stores the first test case and the n test cases, and wherein the flip is reversing the Boolean value of each corresponding node among the plurality of nodes, and n is a natural number greater than or equal to 2.

The plurality of valid cases may include: a case that a Boolean value of an AND operator is true and two Boolean values of two operands are true; a case that the Boolean value of the AND operator is false, and one of the Boolean values of the two operands is true and the Boolean value of the other is false; a case that a Boolean value of an OR operator is false and two Boolean values of two operands are false; and a case that when the Boolean value of the OR operator is true, and one of the Boolean values of the two operands is true and the Boolean value of the other is false.

The controller may generate node data including a name, information on two child nodes, a Boolean value, a flip limit, and the number of flips corresponding to each of the plurality of nodes.

The controller may set the flip limit corresponding to each of the plurality of leaf nodes of which a name is an operand among the plurality of nodes to 1, may set a flip limit of each of the plurality of parent nodes to the sum of the two flip limits for two child nodes thereof, and may set the number of flips of each of the plurality of nodes to 0.

The controller may determine whether a termination condition for the binary expression tree is satisfied, and the termination condition may be satisfied when a number of test cases generated for the binary expression tree is n+1, or the plurality of leaf nodes is flipped at least once.

In response that the termination condition is satisfied, the controller may store the (n+1) generated test case including the first test case and the n test cases in a storage device, When determining that the termination condition is not satisfied, the controller may determine whether there is flip feasibility in each of the plurality of node while traversing the plurality of nodes, and may determine whether there is a flip feasibility path in the binary expression tree based on the flip feasibility of each of the plurality of nodes.

when determining that there is no the flip feasibility path, the controller may flip a first node that cannot be flipped among the plurality of nodes of the binary expression tree and child nodes of the first node, or may flip the first node of the binary expression node, child nodes of the first node, and parent nodes of the first node.

The controller may generate a second binary expression tree by converting a first binary expression tree and may determine whether the second binary expression tree satisfies the termination condition.

The controller may determine that a target node of which flip feasibility is to be determined has the flip feasibility in response that a Boolean value of each of a parent node of the target node and two child nodes of the parent node is one of the plurality of valid cases and a number of flips of the target node is less than a flip limit, The controller may determine that there is a flip feasibility path in the binary expression tree when all nodes connected by trunk lines from a root node among the plurality of nodes to one of a plurality of leaf nodes among the plurality of nodes are capable of being flipped.

When determining that there is the flip feasibility path, the controller may perform a flip on all nodes included in the flip feasibility path and may update the binary expression tree based on the flip.

The controller may generate a test case indicating a result of the flip.

The controller may generate a fourth binary expression tree by performing the flip on a third binary expression tree, and may determine whether the fourth binary expression tree satisfies the termination condition.

According to an exemplary embodiment of the present disclosure, high coverage of a source code can be provided and therefore it can be used in safety-related systems such as vehicles where 100% coverage is recommended.

The present invention enables 100% MCDC coverage to be achieved with (n+1) test cases for verifying source code containing n conditions.

According to an exemplary embodiment of the present disclosure, (n+1) test cases can be achieved in a faster time than existing tools, and the coverage range can be increased without much cost.

According to an exemplary embodiment of the present disclosure, software developers or testers can reduce time or effort in developing test cases.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 shows a table representing Boolean expression characteristics.

Figure 1:
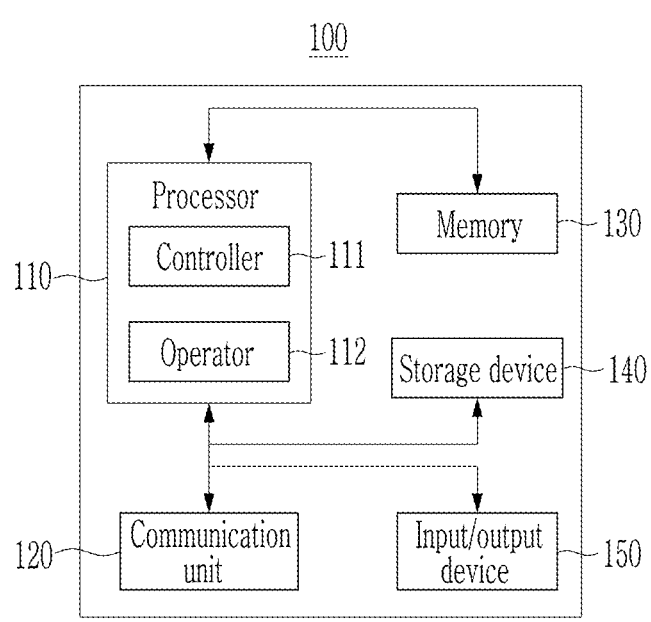
FIG. 1 is a block diagram of a code analysis device according to an exemplary embodiment of the present disclosure.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, referring to the drawings, embodiments disclosed in the present specification will be described in detail, but the same or similar constituent elements are given the same and similar reference numerals, and overlapping descriptions thereof will be omitted. The suffixes "module" and/or "-portion" for the constituent element used in the following description are given or mixed in consideration of only the ease of specification writing, and do not have distinct meanings or roles by themselves. In addition, in describing the exemplary embodiment disclosed in the present specification, when it is determined that a detailed description of a related known technology may obscure the gist of the exemplary embodiment disclosed in the present specification, the detailed description is omitted. In addition, the attached drawings are only for easy understanding of the exemplary embodiment disclosed in the present specification, and the technical idea disclosed in the present specification is not limited by the attached drawings, and all changes included in the spirit and technical range of the present invention should be understood to include equivalents or substitutes.

Terms including ordinal numbers such as first, second, and the like may be used to describe various configurations elements, but the constituent elements are not limited by the terms. The terms are used only for the purpose of distinguishing one constituent element from another constituent element.

In the present application, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof.

Among the configurations according to an exemplary embodiment of the present disclosure, in the configuration for controlling another configuration in a specific control condition, a program implemented as a set of instruction words specifying the control algorithm necessary to control the other configuration may be installed. The control configuration may generate output data by processing input data and stored data according to the installed program. The control configuration may include non-volatile memory to store programs and memory to store data.

FIG. 1 is a block diagram of a code analysis device according to an exemplary embodiment of the present disclosure. The code analysis device 100 may include at least one of a processor 110, a communication unit 120, a memory 130, a storage device 140, and an input/output device 150.

The code analysis device 100 may receive a source code of software (hereinafter, "source code") as an input and generate and output a plurality of test cases that enable coverage of the source code.

The processor 110 may control operations of other constituent elements 120, 130, 140, and 150 of the code analysis device 100. The processor 110 may include a controller 11 and an operator 112. The processor 110 may be implemented in various types such as a micro controller unit (MCU), an application processor (AP), a central processing unit (CPU), a graphic processing unit (GPU), a neural processing unit (NPU), and the like, and may be any semiconductor device that executes instructions stored in the memory 130 or the storage device 140. The processor 110 may be formed to implement functions and methods described below. The operator 112 may be an arithmetic logic unit (ALU).

The controller 111 may control the operation of the operator 112 to analyze an input source code of the code analysis device 100, and may generate a plurality of test cases to analyze the source code. Hereinafter, for convenience of description, the operation of the controller 111 and the operation using the operator 112 by the controller 111 will be described as the operation of the controller 111.

The controller 111 may be implemented in a form of hardware or software, or in a combination of hardware and software.

The communication unit 120 may receive a program through a network as necessary. The communication unit 120 may be a solo or distribution computing device. In addition, the communication unit 120 may transmit an input for the program through the network. The communication unit 120 may communicate wired or wirelessly with external devices, user terminals, etc. The communication unit 120 may establish communication between The code analysis device 100 and an external device or external server. For example, The communication unit 120 may be connected to a network and communicate with an external device through wireless or wired communication. Wireless communications may include, for example, at least one of LTE, LTE Advance (LTE-A), code division multiple access (CDMA), wideband CDMA (WCDMA), universal mobile telecommunications system (UMTS), Wireless Broadband (WiBro), and Global System for Mobile Communications (GSM). According to one embodiment, wireless communication may include short-range communication. A short-range communication may include At least one of Wireless fidelity (WiFi), Bluetooth, Bluetooth low energy (BLE), Zigbee, near field communication (NFC), Magnetic Secure Transmission, radio frequency (RF), and body area network (BAN). Wired communication may include, for example, at least one of universal serial bus (USB), high definition multimedia interface (HDMI), recommended standard 232 (RS232), power line communication, and plain old telephone service (POTS). Network may include at least one of a telecommunications network, for example, a computer network (e.g., a LAN or WAN), the Internet, or a telephone network. The external device may be the same or a different type of device from The code analysis device 100. The communication unit 120 may be implemented as, for example, a cellular module, WiFi module, Bluetooth module, GNSS module, NFC module, or RF module.

The memory 130 and the storage device 140 may include various types of volatile or non-volatile storage media. As an exemplary embodiment of the present disclosure, the memory may include a read-only memory (ROM) and a random access memory (RAM). In the exemplary embodiment of the present disclosure, the memory 130 may be positioned inside or outside the processor 110, and the memory 130 may be connected to the processor 110 through various known means. The memory 130 may store instructions for executing a program. When the program is executed, the processor 110 may fetch instructions from the memory 130.

The storage device 140 may store an algorithm application program indicating software. The storage device 140 may store the plurality of test cases generated by the processor 110.

The input/output device 150 may process various inputs to the system, such as user instructions, and output a screen showing the processed result. The input/output device 150 may transmit commands or data input from user terminals or external devices to other component(s) of the code analysis device 100. The input/output device 150 can output commands or data received from other component(s) of the code analysis device 100 to a user terminal or other external device. The external device may be a computing device including a display device.

When a source code is input through the input/output device 150, the controller 111 analyzes the source code, generates a plurality of test cases for analyzing the source code, and executes the plurality of generated test cases.

When the controller 111 analyzes the source code through the plurality of test cases, the input/output device 150 may output a code coverage result.

The controller 111 may analyze the source code using a modified condition decision coverage (MCDC) method.

Coverage indicates the extent to which the source code itself has been executed, and may be an indicator indicating the extent to which the conditions of the expression indicated by the source code are satisfied through test cases. Here, the expression of the source code may include a plurality of conditions. The plurality of conditions included in the expression may be expressed as an operator in a binary tree.

The coverage may be used to test expressions. The MCDC may represent a test case in which condition/decision coverage is modified by allowing each of the plurality of conditions to independently affect the result of an expression without being affected by the rest of the conditions.

The controller 111 may generate a plurality of test cases for the source code using a Boolean expression representing an expression included in the source code using the MCDC method.

For example, a case that A, B, and C are conditions (or operators), then the expression X=(A||B) && C will be described. If each of A, B, and C is True, the Boolean value of each of A, B, and C is "1", and if each of A, B, and C is False, the Boolean value of each of A, B, and C is "0".

An MCDC test that covers expression X may contain Boolean values for expression X and the conditions included in expression X. Therefore, the MCDC test {A, B, C, X} may include the following four states.

The first state is {A, B, C, X}={1, 0, 1, 1}, the second state is {A, B, C, X}={0, 0, 1, 0}, and the third The states are {A, B, C, X}={0, 1, 1, 1}, and the fourth state is {A, B, C, X}={0, 1, 0, 0}.

Hereinafter, a flip indicates that the state of the condition is converted to the opposite of the current state. For example, if the current state of condition is true (Boolean value "1", or "T"), it is converted to false (Boolean value "0" or "F") through a flip, and if the current state is false, it may be converted to true through a flip.

If the state of A condition and the state of X condition are flipped from the first state, they may be converted to the second state.

If the state of B condition and the state of X condition are flipped from the second state, they may be converted to the third state. If the state of C condition and the state of X condition are flipped from the third state, they may be converted to the fourth state.

In an exemplary embodiment of the present disclosure, the controller 111 may generate the minimum number of test cases that guarantee 100% coverage for the condition indicated by the source code through the MCDC method and the flip. When the number of conditions included in the expression is n, the controller 111 may generate (n+1) valid test cases. Hereinafter, it is assumed that n is a natural number greater than or equal to 2.

Hereinafter, referring to FIG. 2 to FIG. 8E, the operation for the controller 111 to generate a plurality of test cases will be described.

Figure 2:
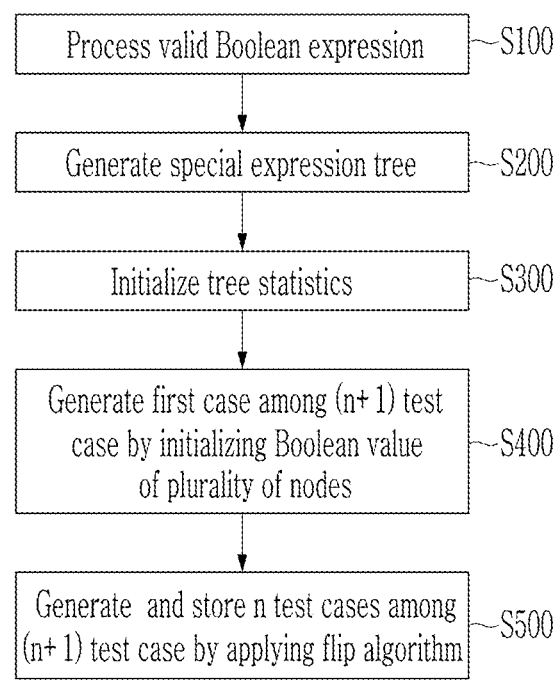
FIG. 2 is a flowchart of a code analysis method according to an exemplary embodiment of the present disclosure.

FIG. 2 is a flowchart of a code analysis method according to an exemplary embodiment of the present disclosure.

The controller 111 may process the expression indicated by the source code as a Boolean expression (S100).

The Boolean expression may include an AND (&&) operator and/or OR(||) operator, which logically connects n conditions and neighboring conditions among the n conditions.

The controller 111 may assign a symbol to each condition included in the Boolean expression and may generate a modified expression by connecting n conditions with && operator and/or || operator. The n conditions may be operands with respect to the && operator and/or || operator. The controller 111 generates the modified expression to process a special expression tree (SET) data structure and a flip algorithm, which will be described later in an exemplary embodiment of the present disclosure. The flip algorithm may in an exemplary embodiment of the present disclosure, represent a way to flip a node from the SET data.

Since the Boolean expression (or modified expression) includes the n conditions, each condition has a Boolean value of true or false, and thus the number of states that a Boolean expression can express may be $2^n$. In addition, the number of plurality of test cases according to various exemplary embodiments of the present disclosure may be n+1.

FIG. 3 shows a table representing Boolean expression characteristics.

In [Table 3], the first row (No.) may indicate a row number.

Referring to FIG. 3, a converted expression by the controller 111 for the first example expression [Inp_INT_IGN2Cnf==On && Inp_INT_FrtWprMistSwState==On && Inp_INT_FrtWprInhibitState==On] in the first row may be "C1 && C2 && C3". Regarding the first example expression, the number of conditions may be n=3, the number of states (total states) may be $2_n=8$, and the number of plurality of test cases according to various exemplary embodiments of the present disclosure may be n+1=4.

A converted expression by the controller 111 for the second example expression ((OTracinfo.fLongPos>=LONG_POS_ZERO) && (Tracinfo.fLongPo>LONG_POS_MAX)) ||Tracinfo.fLatPos>L_PO_FRONT in the second row may be "(C4 && C5)||C6". Regarding the second example expression, the number of conditions may be n=3, the number of states may be $2^n=8$, and the number of plurality of test cases may be n+1=4 according to an exemplary embodiment of the present disclosure.

A converted expression by the controller 111 for the third example expression (FCLD_LO_PO_MIN<=fRange && fRange<FCLD_LO_PO_MAX) && (fTheta<FCLDR_FOV_AN_TH)) in the third row may be "(C7 && (C8 && C9))". Regarding the third example expression, the number of conditions may be n=3, the number of states may be $2^n=8$, and the number of plurality of test cases may be n+1=4 according to an exemplary embodiment of the present disclosure.

Regarding the fourth example expressions Inp_SKSt==SKSt__Learnt && Inp_CapaSnsrState==CapaSnsrState_Applied && Inp_AllDoors==On && Inp_AllDoorUnlock==Off && (Inp_INT_TerminalCtlGroup==TerminalCtlGroup__On|| ((Inp_TerminalCtlGroup==TerminalCtlGroup__Acc|| Inp_TerminalCtlGroup==TerminalCtlGroup__Ign) && Inp_INT_VehicleSpeed<5 && (Inp_INT_MTOpState==MTOpState__Applied||Inp_AMTOpState==AMTOpState__Applied||Inp_INT_Pos==On))||Inp_INT_RSPACrakState==On) && (Inp_SmtWelcomePreAuthState==PREAUTH_DRVSIDE||Inp_SmrtSlgDrPreAuthState==SMRTSLDPREAUTH_DRVSIDE) && Inp_b_DRUnlockDisableAfterLock==Off && hasChangedTo(Inp_INT_DrvCaSnsrUnlockSwSt,On), an expression converted by the controller 111 may be "a && b && c && d && e && (f||((g||h) && i && (j||k||l))||m) && (n||o) && p && q". Regarding the fourth example expression, the number of conditions may be n=17, the number of states may be $2^n=131,072$, and the number of plurality of test cases may be n+1=18 according to an exemplary embodiment of the present disclosure.

As such, in the case of an expression including n conditions, 100% coverage of the source code can be achieved with only (n+1) number of plurality of test cases according to an exemplary embodiment of the present disclosure. For example, when there are 17 conditions, there are 131,072 states, but only 18 test cases may achieve source code coverage, and thus the code analysis device 100 may save the time required to generate test cases.

Referring to FIG. 2, the controller 111 may generate a special expression tree (S200).

The controller 111 may generate special expression trees using standard methods from Boolean expressions. In the special expression tree, a root node is one node without a parent node, and a leaf node may represent a plurality of nodes without child nodes. In the special expression tree, a parent node and a child node may be connected by an edge. Nodes other than the root node and leaf nodes in the special expression tree may be referred to as intermediate nodes.

The special expression tree is a binary tree in which an operand is represented by a leaf node and an operator is represented by a root node or an intermediate node among a plurality of nodes included in the special expression tree (hereinafter, "plurality of nodes"). Since the special expression tree is a binary tree, the root node and the intermediate node must have two child nodes, and there cannot be only one child node.

The controller 111 may convert a Boolean expression into a modified expression, and may generate a special expression tree from the modified expression. Here, the modified expression may be generated by the controller 111 in S100.

Figure 4:
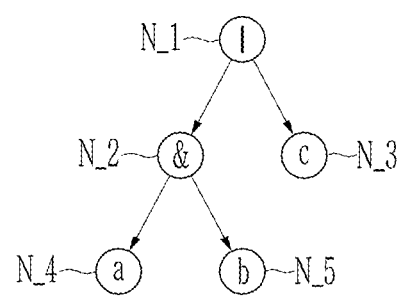
FIG. 4 is an exemplary diagram of a special expression tree.

FIG. 4 is an exemplary diagram of a special expression tree.

For example, when the Boolean expression is ((OTracinfo.fLongPos>=LONG_POS_ZERO) && (Tracinfo.fLongPo>LONG_POS_MAX))|| (Tracinfo.fLatPos>L_PO_FRONT), the modified expression is "((a&&b)||c)", and the modified expression is expressed as a special expression tree as shown in FIG. 4.

The modified expression is formed of the || operator and its operand "(a&&b)" and "c". The controller 111 may display the || operator (shown as "|" for convenience in FIG. 4) on a node N_1, which is a root node. "(a&&b)", which is an operand of the || operator is formed of the && operator and its operands "a" and "b". The controller 111 may display the && operator (shown as "&" for convenience in FIG. 4) on a node N_2, which is one of two child nodes N_2 and N_3 of the node N_1. The operands "a" and "b" of the && operator may each be displayed on two child nodes N_4, and N_5 of the node N_2. The operand c of the || operator may be displayed on a node N_3, which is the other one of child nodes N2 and N_3 of the node N_1.

A data structure of each plurality of nodes may include node data. The controller 111 may generate node data that correspondingly match each of the plurality of nodes. The node data may include a name of data represented by each node, left child node information, right child node information, a Boolean value boolVal, flip limit (flipLimit), the number of flips, and the like represented by each node. The contents of node data will be described hereinafter.

The name may be an operator or a value of the operator. The name may be used to determine whether the corresponding node is an operand or an operator. Here, the operator may be "&&" or "||".

The left child node information may be an address of a left child node in a binary tree node. The right child node information may be an address of a right child node in a binary tree node. The Boolean value may be a Boolean value evaluated at the corresponding node, and may be true ("True" or "T") or false ("False" or "F").

The flip limit may be the maximum value of the number of flips required by the corresponding node. The flip limit may be a natural number greater than or equal to 1. The number of flips may be the number of flips counted in the flip algorithm and may be dynamically changed by the program. The number of flips may be an integer greater than or equal to 0 and less than or equal to n. In the following, flipping a node represents changing the Boolean value of a node from true (T) to false (F) or vice versa.

Referring to FIG. 2, the controller 111 may initialize the tree statistics of the special expression tree (S300).

Here, the tree statistics may be the flip limit and the number of flips. The controller 111 may initialize the flip limit and the number of flips among node data by analyzing the special expression tree.

The plurality of test cases generated in an exemplary embodiment of the present invention may be tested once for each of the plurality of conditions. The controller 111 may count the number of related conditions from a leaf node level of the special expression tree to the root node. Hereinafter, with reference to this, an operation of initializing the flip limit and the number of flips by the controller 111 will be described.

Analyzing the special expression tree by the controller 111 may include an operation of analyzing whether each of a plurality of nodes included in the special expression tree is a leaf node having an operand as a name or a parent node having an operator as a name. In addition, the controller 111 may analyze the flip limit of each of the two child nodes (each node having an operand of an operator as a name) of the parent node among the plurality of nodes. The controller 111 may initialize the flip limit of each plurality of nodes based on the above analysis result.

The flip limit is a constant value. The controller 111 may initialize the flip limit of all nodes (leaf nodes) of which names are operands among the plurality of nodes to 1. This is because every leaf node with an operand as its name only needs to change its condition once. For example, if the Boolean value of the operand is true, the condition only needs to be changed once because it can be changed from true to false via a flip. Conversely, if the Boolean value of the operand is false, it can be changed from false to true through a flip.

The controller 111 may initialize the flip limit of the plurality of parent nodes having an operator as a name among the plurality of nodes as a sum of two flip limits for two child nodes. For example, if both flip limits of the two child nodes of an AND operator node are 1, the flip limit of the AND operator node may be 1+1=2.

In the example of FIG. 4, the node N_3, the node N_4, the node N_5 are operand nodes, and therefore the controller 111 may initialize them by setting their flip limits to 1. Since the node N_2 is the parent node of the node N_4 and the node N_5, the controller 111 may initialize the flip limit of the node N_2 to 1+1=2. Since the node N_1 is the parent node of the node N_2 and the node N_3, the controller 111 may initialize the flip limit of the node N_1 to 2+1=3.

The number of flips is a value that changes according to the flip algorithm. In the plurality of nodes, the maximum number of flips may be a flip limit value.

In addition, the controller 111 may initialize all flip number values to 0 in each of the plurality of nodes.

Referring to FIG. 2, the controller 111 may initialize Boolean values of the plurality of nodes and generate the first case among (n+1) test cases (S400).

The controller 111 may allocate a Boolean value to the plurality of nodes and may perform initialization. The Boolean value of the root node may be predetermined based on initial information, or the controller 111 may determine either true or false. The controller 111 may determine a value of a lower node excluding the root node among the plurality of nodes as one of a plurality of valid cases shown in [Table 1] and [Table 2] below. Through S400, the controller 111 may quickly provide optimum test case generation. The controller 111 initializes the special expression tree in an optimal state that can be flipped, and may improve the accuracy of test case generation compared to the case of random initialization.

The controller 111 may initialize Boolean values of a parent node of the plurality of nodes, of which the name is an operator, and two child nodes of the parent node, as a value of one of the plurality of valid cases. A plurality of valid cases for an AND operator node and its two child nodes among the plurality of parent nodes are shown in [Table 1], and a plurality of valid cases for an OR operator node and its two child nodes among the plurality of parent nodes are shown in [Table 2] below.

TABLE 1

| AND | Left | Right |
|-----|------|-------|
| T   | T    | T     |
| F   | T    | F     |
| F   | F    | T     |

Referring to [Table 1], if the node name is AND and the Boolean value is true (T), the controller 111 may allocate the Boolean value of the two child nodes as {T, T}. If the node name is AND and the Boolean value is false (F), the controller 111 may allocate the Boolean values of the left child node and the right child node as {T, F} or {F, T}. If the Boolean value for the AND operator node and its two child nodes is one of the plurality of valid cases shown in [Table 1], it is assumed to be a valid case. For reference, if the node name is AND and the Boolean value is false (F), assigning the Boolean value of the two child nodes to {F, F} is considered to be an invalid case to prevent delay and thus is excluded.

TABLE 2

| OR | Left | Right |
|----|------|-------|
| F  | F    | F     |
| T  | T    | F     |
| T  | F    | T     |

Referring to [Table 2], if the node name is OR and the Boolean value is false (F), the controller 111 may allocate the Boolean value of the two child nodes as {F, F}. If the node name is OR and the Boolean value is true (T), the controller 111 may allocate the Boolean values of the left child node and the right child node as {T, F} or {F, T}. If the Boolean value for the OR operator node and its two child nodes is one of the plurality of valid cases shown in [Table 2], it is assumed to be a valid case. For reference, if the node name is OR and the Boolean value is true (T), assigning the Boolean value of the two child nodes as {T, T} is considered to be an invalid case to prevent delay and thus is excluded.

Through S400, the controller 111 may generate the first test case among (n+1) test cases. The controller 111 may provide the first test case by collecting Boolean values of all operand nodes (or leaf nodes). Hereinafter, a test case may include a Boolean value of a root node and all operand nodes (or all leaf nodes) among the plurality of nodes. Alternatively, the test case may contain the Boolean values of all operand nodes (or all leaf nodes).

In the example of FIG. 4, if the Boolean value of each of the plurality of nodes N_1 to N_5 is allocated to F, it is not a valid case and thus such initialization is inappropriate.

In the example of FIG. 4, if the Boolean values of the plurality of nodes N_1 to N_5 are {T, T, F, T, T}, the Boolean values of all operator nodes and their two child nodes are one of the plurality of valid cases, and thus such initialization is appropriate. In this case, the controller 111 may generate the first test case {a, b, c}={T, T, F}.

The controller 111 may store the first test case generated as a valid case in the storage device 140.

Referring to FIG. 2, the controller 111 may generate and store n test cases out of (n+1) test cases by applying the flip algorithm (S500).

The controller 111 may intelligently identify one operand node that flips the root node by searching the special expression tree initialized in an optimal state in S400.

The operation of the controller 111 searching the special expression tree to intelligently identify one operand node flipping the root node from node can be described as follows. If a flip is possible on a specific node, the controller 111 modifies the special expression tree and marks the flipped operand as flipped. If a flip is not possible on a specific node, the controller 111 modifies the special expression tree into the nearest best tree by performing a tree transform operation on the special expression tree. The controller 111 may repeat the special expression tree search if the number of generated task cases does not reach (n+1) (n is the number of operand nodes in the special expression tree, and n is a natural number of 2 or more).

Hereinafter, referring to FIG. 5, the detailed steps of step S500 will be described.

Figure 5:
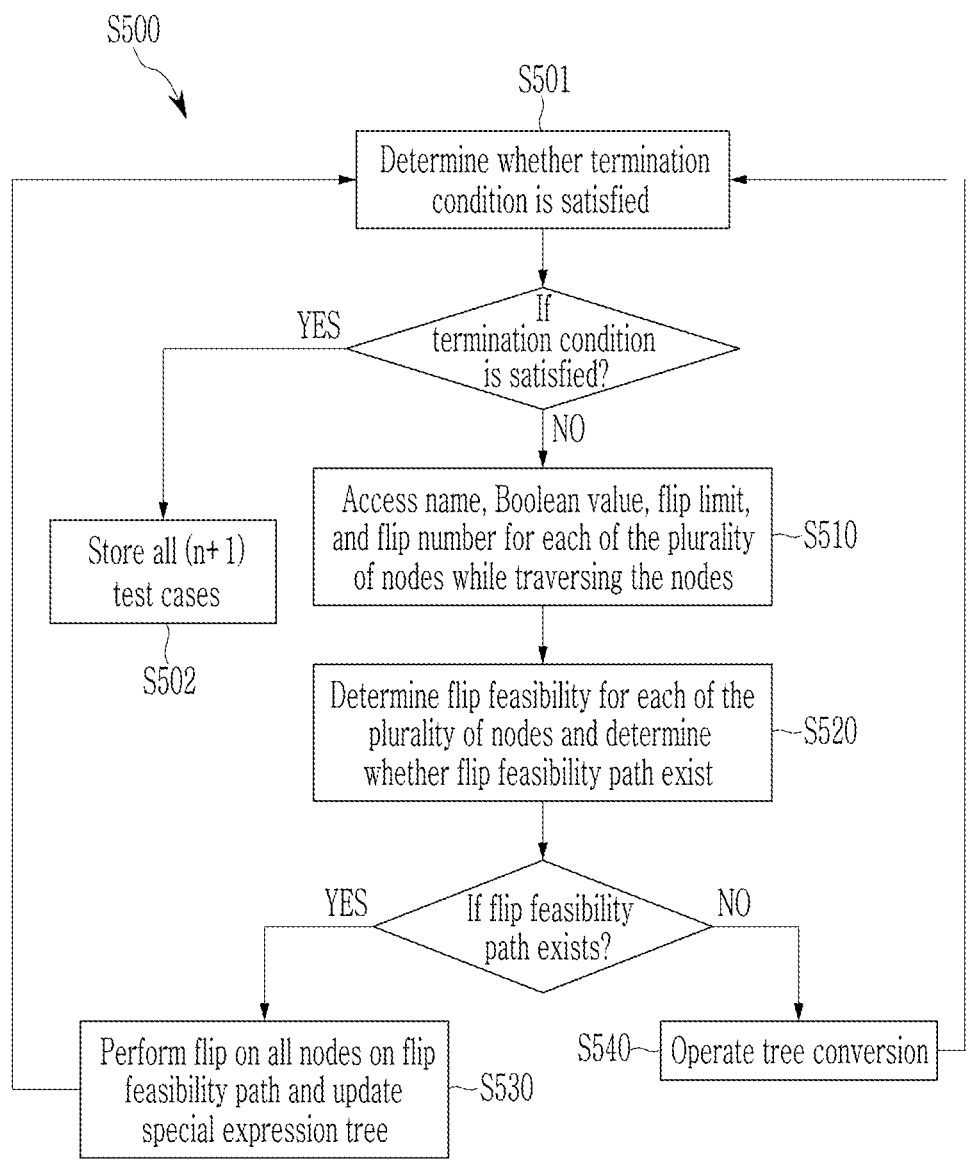
FIG. 5 is a detailed flowchart of S500 shown in FIG. 2.

FIG. 5 is a detailed flowchart of S500 shown in FIG. 2.

The controller 111 may check whether the termination condition is satisfied for the special expression tree (S501).

Here, the termination condition is satisfied when (n+1) test cases for the special expression tree are generated, or when all operands (leaf nodes) included in the special expression node are flipped at least once.

If it is determined that the termination condition is not satisfied in S501, the controller 111 may traverse the plurality of nodes and access a name, a Boolean value, a flip limit, and a flip number for each of the plurality of nodes (S510).

Since the special expression tree is a type of binary tree, the controller 111 may perform a binary tree traversal on the special expression tree, and the traversal order of a plurality of nodes is not limited.

Traversing a plurality of nodes may indicate sequentially moving from a root node to one of two child nodes of each node. Among the two child nodes of one parent node, a child node of which the number of flips is greater than the flip limit has reached the flip limit, and therefore traversing to the corresponding child node is not necessary.

The controller 111 may access a name, a Boolean value, a flip limit, and the number of flips of each node being traversed. In addition, the controller 111 may also inspect the properties of two child nodes. For example, the controller 111 may determine what the Boolean value of the left child node is, whether the number of flips of the left child node has reached the flip limit, and so on.

The controller 111 may determine flip feasibility in each of the plurality of nodes, and determine whether there is a flip feasibility path based on the flip feasibility (S520).

If a parent node of a target node (hereinafter, "target node") to determine the flip feasibility and two child nodes of the parent node have a Boolean value of a valid case and the number of flips of the target node is less than the flip limit, the controller 111 may determine that there is the flip feasibility of the target node.

Here, the valid case may be one of a plurality of valid cases shown in [Table 1] and [Table 2] described above.

Since there is no parent node of the target node if the target node is the root node, if the number of flips of the target node is less than the flip limit, the controller 111 may determine that there is the flip feasibility of the target node.

Hereinafter, an example in which the controller 111 determines the flip feasibility for each plurality of nodes will be described with reference to [Table 3] below.

TABLE 3

| No. | Operator | Node boolVal | Left child boolVal | Right child boolVal | Left Limit? | Left Feasible? | Right Limit? | Right Feasible? |
|---|---|---|---|---|---|---|---|---|
| 1 | && | T | T | T | N | Y | N | Y |
| 2 | && | F | T | F | N | Y | N | Y |
| 3 | && | F | F | T | N | Y | N | Y |
| 4 | && | F | F | F | N | N | N | N |
| 5 | && | X(T/F) | X(T/F) | X(T/F) | Y | N | Y | N |
| 6 | \|\| | F | F | F | N | Y | N | Y |
| 7 | \|\| | T | T | F | N | Y | N | Y |
| 8 | \|\| | T | F | T | N | Y | N | Y |
| 9 | \|\| | T | T | T | N | N | N | N |
| 10 | \|\| | X(T/F) | X(T/F) | X(T/F) | Y | N | Y | N |

In [Table 3], the first column (No.) may indicate a row number. In [Table 3], "Node" denotes a parent node of a target node, "Left child" or "Left" denotes the left child node of the parent node, and "Right child" or "Right" denotes the right child node of the parent node. It will be described that the left child node or right child node of the parent node as the target node.

Referring to the first to third rows in [Table 3], a case that Boolean values of the AND (&&) operator node, the left child node, and the right child node are respectively {T, T, T}, {F, T, F}, or {F, F, T} will be described. Since this case has a Boolean value of a valid case, if the number of flips in each of the target nodes of the two child nodes of the AND operator node is less than the flip limit (Limit=N), the controller 111 determines that there is the flip feasibility of the target node (Feasible=Y).

Referring to the fourth row in [Table 3], a case that Boolean values of the AND operator node, the left child node, and the right child node are respectively {F, F, F} will be described. Since this case has a Boolean value of an invalid case, the controller 111 determines that there isn't the flip feasibility of the target node (Feasible=N).

Referring to the fifth and tenth rows in [Table 3], the number of flips in the target node of each of the two child nodes of the operator node is greater than or equal to the flip limit (Limit=Y), and thus the controller 111 may determine that the target node does not have flip feasibility (Feasible=N) regardless of whether the Boolean values of the parent node of the target node and the two child nodes of the parent node are values of the valid case.

Referring to the sixth to eighth rows in [Table 3], a case that Boolean values of the OR (||) operator node, the left child node, and the right child node are respectively {F, F, F}, {T, T, F}, or {T, F, T} will be described. In this case, the Boolean values have values of the valid case, and thus the controller 111 may determine that the target node has the flip feasibility (Feasible=Y) if the number of flips is less than the flip limit (Limit=N) in the target node of each of the two child nodes of the OR operator node.

Referring to the ninth row in [Table 3], a case that Boolean values of the OR operator node, the left child node, and the right child node are {T, T, T} will be described. In this case, the Boolean values are invalid, and thus the controller 111 may determine that the target node of each of the two child nodes of the OR operator node does not have the flip feasibility (Feasible=N).

As such, the controller 111 may determine whether there is a path through which a flip can be performed from a root node to a leaf node by checking flip feasibility for each of the plurality of nodes.

If it is determined that the target node has the flip feasibility and at least one of the two child nodes of the target node can be flipped, the controller 111 will recursively traverse to one of the at least one of the child nodes of the target node, which has flip feasibility. The controller 111 may check whether the flip is feasible until the target node reaches the leaf node. If all nodes connected by trunk lines from the root node to one of the plurality of leaf nodes on a single path are capable of being flipped, the controller 111 may determine that there is a flip feasibility path in the special expression tree (or plurality of nodes).

If it is determined in S520 that there a flip feasibility path exists, the controller 111 may perform a flip on all nodes on the flip feasibility path, and may modify and update a special expression tree based on the flip (S530).

If it is determined that a plurality of nodes has a flip feasibility path, the controller 111 may perform a flip on all nodes included in the flip feasibility path and generate a test case representing a result of the flip. The controller 111 may store the test case in the storage device 140 whenever it is generated in S530, or when (n+1) test cases are generated in S502, which will be described later, the controller 111 may store the (n+1) test cases in the storage device 140.

When a flip is performed, the controller 111 modifies node data corresponding to each node included in the flip feasibility path and updates the existing special expression tree by generating a special expression tree representing the modified node data, and may generate a test case representing a Boolean value of all nodes (or all leaf nodes) having an operand as a name among a plurality of nodes.

Hereinafter, referring to FIG. 6, a flip feasibility path will be described.

Figure 6:
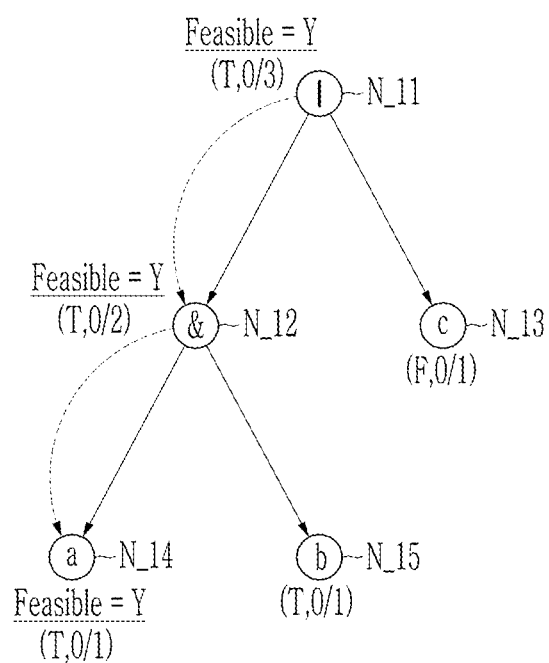
FIG. 6 exemplarily show a plurality of nodes when the flip feasibility path exists.

FIG. 6 exemplarily show a plurality of nodes when the flip feasibility path exists.

The name of the node N_11 is the OR operator, the Boolean value is T, the flip limit is 3, and the number of flips is 0 {T, 0/3}. The name of the node N_12 is the AND operator, the Boolean value is T, the flip limit is 2, and the number of flips is 0 {T, 0/2}. The name of the node N_13 is the operand c, the Boolean value is F, the flip limit is 1, and the number of flips is 0 {F, 0/1}. The name of the node N_14 is the operand a, the Boolean value is T, the flip limit is 1, and the number of flips is 0 {T, 0/1}.

Since the controller 111 sets the node N_11 as a target node and the number of flips of node N_11 is less than the flip limit, it may be determined that the node N_11 has the flip feasibility (Feasible=Y).

Since the target node and two child nodes of the node N_11 have Boolean values of a valid case, the controller 111 may set one of the two child nodes, the left child node N_12, as the target node. The number of flips of node N_12 is less than the flip limit, and therefore, the controller 111 may determine that the node N_12 has the flip feasibility (Feasible=Y).

Since the target node and two child nodes of the node N_12 have Boolean values of a valid case, the controller 111 may set one of the two child nodes, the left child node N_14, as the target node. The number of flips of node N_14 is less than the flip limit, the controller 111 may determine that the node N_14 has the flip feasibility (Feasible=Y).

Accordingly, the controller 111 may determine a path from the root node N_11 to the leaf node N_14 through the node N_12 as a flip feasibility path.

Referring to FIG. 5, if it is determined that there is no flip feasibility path in S520, the controller 111 may perform a tree transformation operation on the special expression tree S540.

Here, if there is no flip feasibility path, it may indicate that a node that cannot be flipped is encountered during traversal.

The tree transformation operation is to modify a tree to the nearest optimal tree, and specifically, it may be an operation to flip a node that cannot be flipped and all of its child nodes (hereinafter, including the child nodes of children), or may be an operation to flip a node that cannot be flipped and all of its parent nodes (hereinafter, including parent nodes of parents) and its child nodes. In this case, it should be noted that the number of flips does not change.

The controller 111 may determine that the target node cannot be flipped if the parent node of the target node and two child nodes of the parent node have Boolean values of an invalid case, or if the number of flips of the target node exceeds the flip limit.

The tree transformation operation may be one of a first tree transformation operation for a case that a parent node of a target node and two child nodes of the parent node have Boolean values of an invalid case, and a second tree transformation operation for a case that the number of flips of the target node is greater than the flip limit.

The first tree transformation operation may include an operation that, if the parent node of the target node and the two child nodes of the parent node have Boolean values of an invalid case, the controller 111 flips a target node, which is one of the two child nodes of the parent node, and all of the child nodes of the target node.

The second tree transformation operation may include an operation that the controller 111 flips a target node of which the number of flips is equal to or greater than the flip limit, parent nodes of the target node, and all of child nodes of the target node.

The controller 111 may generate a special expression tree to which a tree transformation operation is applied. However, a case indicated by a special expression tree to which tree transformation operation is applied is not regarded as a test case. Therefore, the controller 111 does not generate a test case indicating a special expression tree to which a tree transformation operation is applied.

Hereinafter, referring to FIG. 7A to FIG. 7D, the operation of the controller 111 in the case that flipping is infeasible.

FIG. 7A, FIG. 7B, FIG. 7C, and FIG. 7D exemplarily show a plurality nodes in the case that flipping is infeasible.

Figure 7A:
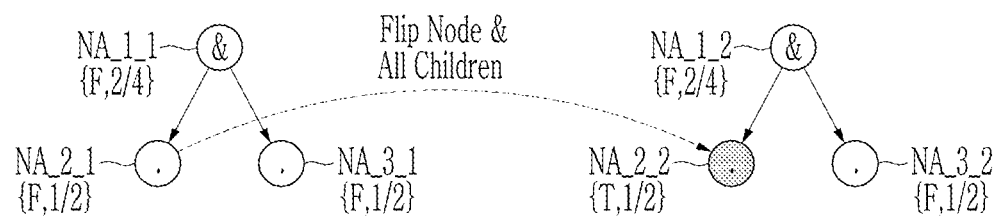
FIG. 7A, FIG. 7B, FIG. 7C, and FIG. 7D exemplarily show a plurality nodes in the case that flipping is infeasible.

Referring to FIG. 7A, the name of the node NA_1_1 is the AND operator, the Boolean value is F, the flip limit is 4, and the number of flips is 2 {F, 2/4}. The name of the node NA_2_1 is an operand, the Boolean value is F, the flip limit is 2, and the number of flips is 1 {F, 1/2}. The name of the node NA_3_1 is an operand, the Boolean value is F, the flip limit is 2, and the number of flips is 1 {F, 1/2}. Boolean values of the parent node NA_1_1 of a target node, which is one of the two children nodes NA_2_1 and NA_3_1, and the two children nodes NA_2_1 and NA_3_1 are {F, F, F} in the AND operator, the Boolean values have values of an invalid case. Thus, the controller 111 may determine that the two children nodes NA_2_1 and NA_3_1 have flip infeasibility. Accordingly, the controller 111 may flip all of the node NA_2_1, which is one of the two children nodes NA_2_1, NA_3_1 and children nodes (not shown) of the node NA_2_1.

The node NA_1_2 is the same as the node NA_1_1 before the flip, and the node NA_3_2 is the same as the node NA_3_1 before the flip. The node NA_2_2 is flipped from the node NA_2_1 before the flip, and thus the name of the node NA_2_2 is an operand, the Boolean value is changed to T, the flip limit is 2, and the number of flips remains 1 {T, 1/2}.

Figure 7B:
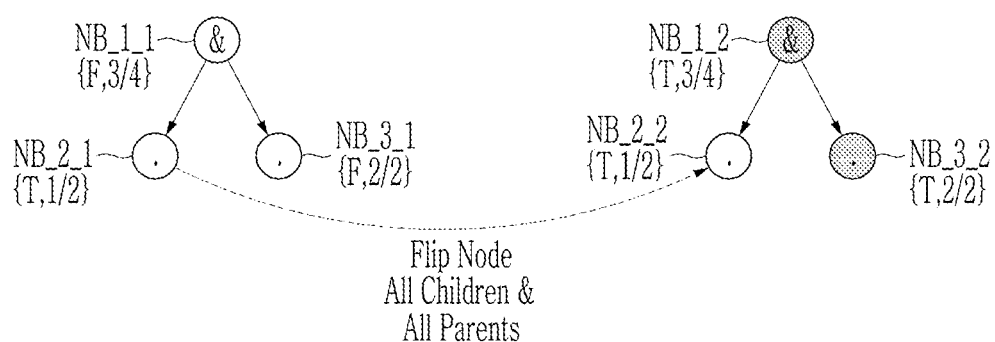

Referring to FIG. 7B, the name of the node NB_1_1 is the AND operator, the Boolean value of F, the flip limit is 4, and the number of flips is 3 {F, 3/4}. The name of the node NB_2_1 is an operand, the Boolean value is T, the flip limit is 2, and the number of flips is 1 {T, 1/2}. The name of the node NB_3_1 is an operand, the Boolean value is F, the flip limit is 2, and the number of flips is 2 {F, 2/2}.

When one of the two child nodes NB_2_1 and NB3_1 of the operator node NB_1_1 is used as a target node, the number of flips of the node NB_3_1 is greater than the flip limit, and thus the controller 111 may determine that the node NB_3_1 cannot be flipped. Accordingly, the controller 111 may flip all of the node NB_3_1, the parent node NB_1_1 of the node NB_3_1 and child nodes (not shown) of the node NB_3_1 through the second tree transformation operation.

The node NB_1_2 is flipped from the node NB_1_1 before the flip, and the name of the node NB_2_2 is the AND operator, the Boolean value is changed to T, the flip limit is 4, and the number of flips remains 3 {T, 3/4}. The node NB_2_2 is the same as the node NB_2_1 before the flip. The node NB_3_2 is flipped from the node NB_3_1 before the flip, and the name of the node NB_3_2 is an operand, the Boolean value is T, the flip limit is 2, and the number of flips remains 2 {T, 2/2}.

Figure 7C:
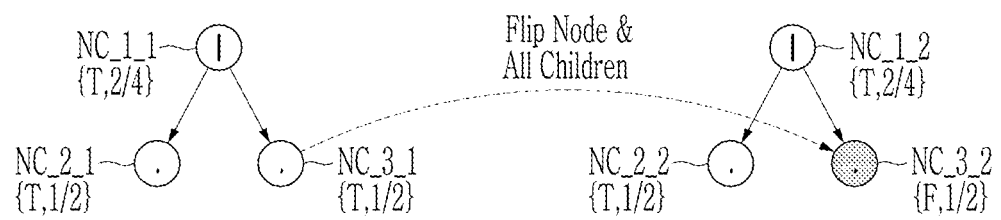

Referring to FIG. 7C, the name of the node NC_1_1 is the OR operator, the Boolean value is T, the flip limit is 4, and the number of flips is 2 {T, 2/4}. The name of the node NC_2_1 is an operand, the Boolean value is T, the flip limit is 2, and the number of flips is 1 {T, 1/2}. The name of the node NC_3_1 is an operand, the Boolean value is T, the flip limit is 3, and the number of flips is 1 {T, 1/3}.

The parent node NC_1_1 of the target node, which is one of the two child nodes NC_2_1 and NC_3_1 and the two child nodes NC_2_1 and NC3_1 have Boolean values of an invalid case because the Boolean values are {T, T, T} in the OR operator. Therefore, the controller 111 may determine that the two child nodes NC_2_1 and NC_3_1 cannot be flipped. Accordingly, the controller 111 may flip all of the node NC_3_1, which is one of the two child nodes NC_2_1 and NC_3_1 and the child nodes (not shown) of the node NC_3_1 through the first tree transformation operation.

The node NC_1_2 is equal to the node NC_1_1 before the flip, and the node NC_2_2 is the same as the node NC_2_1 before the flip. The node NC_3_2 is flipped from the node NC_3_1 before the flip, and the thus name of the node NC_3_2 is an operand, the Boolean value is changed to F, the flip limits is 2, and the number of flips remains 1 {F, 1/2}.

Figure 7D:
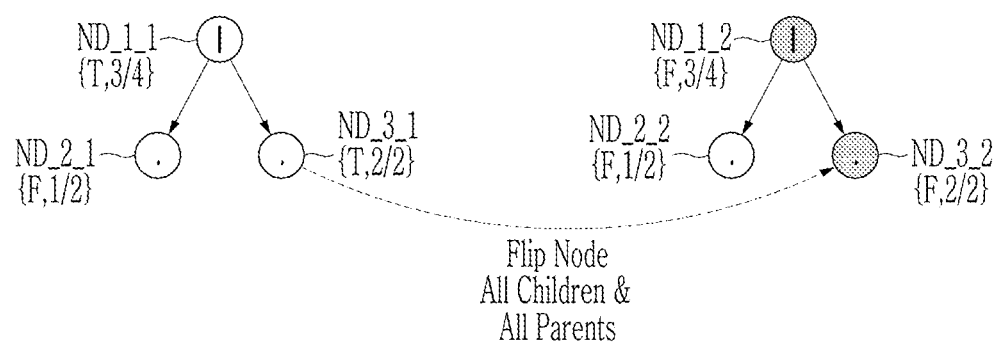

Referring to FIG. 7D, the name of the node ND_1_1 is the OR operator, the Boolean value is T, the flip limit is 4, and the number of flips is 3 {T, 3/4}. The name of the node ND_2_1 is an operand, the Boolean value is F, the flip limit is 2, and the number of flips is 1 {F, 1/2}. The name of the node ND_3_1 is an operand, the Boolean value is T, the flip limit is 2, and the number of flips is 2 {T, 2/2}.

When one of the two child nodes ND_2_1 and ND3_1 and the operator node ND_1_1 is used as a target node, the number of flips of the node ND_3_1 is greater than the flip limit, and thus the controller 111 may determine that the node ND_3_1 cannot be flipped. Accordingly, the controller 111 may flip all of the node ND_3_1, the parent node ND_1_1 of the node ND_3_1 and child nodes (not shown) of the node ND_3_1.

The node ND_1_2 is flipped from the node ND_1_1 before the flip and thus the name of the node ND_2_2 is the OR operator, the Boolean value is changed to F, the flip limit is 4, and the number of flips remains 3 {F, 3/4}. The node ND_2_2 is equal to the node ND_2_1 before the flip. The node ND_3_2 is flipped to the node ND_3_2 before the flip and thus the name of the node ND_3_2 is an operand, the Boolean value changed to F, the flip limit is 2, and the number of flips remains 2 {F, 2/2}.

Referring to FIG. 5, the controller 111 may perform step S501 following step S530 or step S540.

For example, the controller 111 may generate a second special expression tree by applying the tree transformation operation to a first special expression tree in S540. The controller 111 may perform step S501 with respect to the second special expression tree. That is, the controller 111 may determine if the second special expression tree satisfies the termination condition of step S501. In addition, the controller 111 may generate a fourth special expression tree from a third special expression tree by performing a flip in S530. The controller 111 may perform step S501 with respect to the fourth special expression tree. That is, the controller 111 may determine if the fourth special expression tree satisfies the termination condition of step S501.

When it is determined that the termination condition is satisfied in S501, the controller 111 may store all the generated (n+1) test case in the storage device 140 (S502).

When all operand nodes included in the plurality of nodes are flipped one or more times, the controller 111 may store the Boolean value of all nodes (or all leaf nodes) of which names are operands among the plurality of nodes for each of (n+1) test cases.

Hereinafter, referring to [Table 4] and FIG. 8A, FIG. 8B, FIG. 8C, FIG. 8D, and FIG. 8E, the operation of generating and storing (n+1)=4 test in the case that there are n=3 operands (a, b, c) will be described.

TABLE 4

| No. | Root | a | b | c | Step | Stored? |
|---|---|---|---|---|---|---|
| 1 | T, 0/3 | T, 0/1 | T, 0/1 | F, 0/1 | Init | Y |
| 2 | F, 1/3 | F, 1/1 | T, 0/1 | F, 0/1 | Flip a | Y |
| 3 | T, 1/3 | T, 1/1 | T, 0/1 | F, 0/1 | Transform a | N |

TABLE 4-continued

| No. | Root | a | b | c | Step | Stored? |
|---|---|---|---|---|---|---|
| 4 | F, 2/3 | T, 1/1 | F, 1/1 | F, 0/1 | Flip b | Y |
| 5 | T, 3/3 | T, 1/1 | F, 1/1 | T, 1/1 | Flip c | Y |

In [Table 4], the first column (No.) may denote a row number. FIG. 8A, FIG. 8B, FIG. 8C, FIG. 8D, and FIG. 8E exemplarily show a plurality nodes generating test cases.

In FIG. 8A, FIG. 8B, FIG. 8C, FIG. 8D, and FIG. 8E, it is described that a special expression tree representing test cases generated by the controller 111 sequentially in time.

FIG. 8A, FIG. 8B, FIG. 8C, FIG. 8D, and FIG. 8E may show a plurality of nodes for a modified expression "((a && b)||c)". Hereinafter, it will be described that the plurality of nodes are the operator OR node (|), the operator AND node (&), an a operand node, a b operand node, and a c operand node.

Figure 8A:
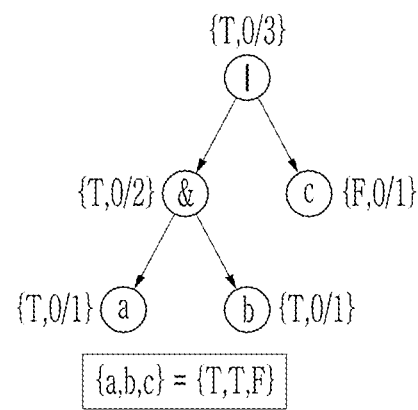
FIG. 8A, FIG. 8B, FIG. 8C, FIG. 8D, and FIG. 8E exemplarily show a plurality nodes generating test cases.

Referring to FIG. 8A, the Boolean value of the OR node is T, the flip limit is 3, and the number of flips is 0 {T, 0/3}. The Boolean value of the & node is T, the flip limit is 2, and the number of flips is 0 {T, 0/2}. The Boolean value of the a node is T, the flip limit is 1, and the number of flips is 0 {T, 0/1}. The Boolean value of the b node is T, the flip limit is 1, and the number of flips is 0 {T, 0/1}. The Boolean value of the c node is F, the flip limit is 1, and the number of flips is 0 {F, 0/1}.

In FIG. 8A, the Boolean values of the operand {a, b, c} are {T, T, F}.

Referring to the first row in [Table 4], the first test case is {a, b, c}={T, T, F}, and the step of the first test case is an initial state (Init). The controller 111 may generate a first test case and may store the first test case in the storage device 140.

In the first test case, a path from the OR node, which is the root node, through the AND node, to the a node, which is the leaf node, is a flip feasibility path. The controller 111 may generate a second test case in which a flip of a flip feasibility path is performed from the first test case. A special expression tree representing the second test case is shown in FIG. 8B.

Figure 8B:
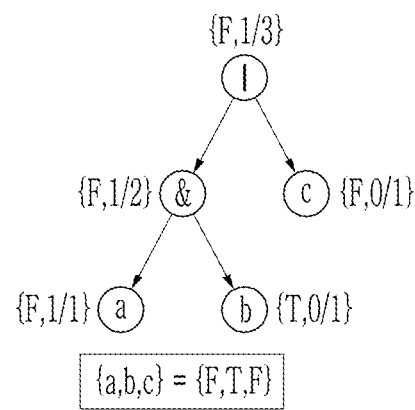

Referring to FIG. 8B, the OR node, the AND node, the a node are flipped. Accordingly, the Boolean value of the OR node is changed to F and the number of flips is increased to 1 {F, 1/3}. The Boolean value of the & node is changed to F and the number of flips is increased to 1 {F, 1/2}. The Boolean value of the a node is changed to F and the number of flips is increased to {F, 1/1}. The b node and the c node are the same as those shown in FIG. 8A.

In FIG. 8B, the Boolean values of the operand {a, b, c} are {F, T, F}.

Referring to the second row in [Table 4], the second test case is {a, b, c}={F, T, F}, and the step of the second test case is a state of the flip operation on the a node (Flip a). The controller 111 may generate the second test case and store the second test case in the storage device 140.

In the second test case, since the number of flips of the a node, which is the left child of the AND node, exceeds the flip limit, the a node cannot be flipped.

Therefore, the controller 111 may generate a special expression tree to which the second tree conversion operation is applied. The controller 111 performs flips on the AND nodes and the OR nodes, which are all parent nodes of the a node, from the second test case, and does not change the number of flips. The special expression tree with the tree conversion operation applied is shown in FIG. 8C.

Figure 8C:
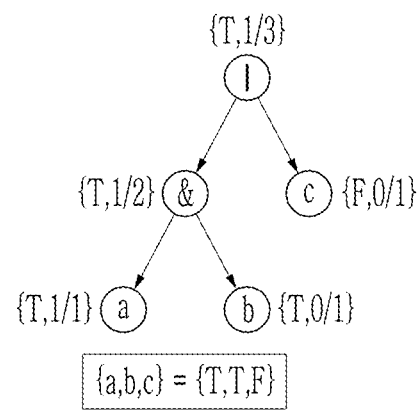

Referring to FIG. 8C, the OR node, the AND node, and the a node are flipped. Thus, the Boolean value of the OR node is changed to T and the number of flips remains 1 {T, 1/3}. The Boolean value of the AND node is changed to T and the number of flips remains 1 {T, 1/2}. The Boolean value of the a node is changed to T and the number of flips remains 1 {T, 1/1}. The b node and the c node are the same as those in FIG. 8B.

In FIG. 8C, the Boolean values of the operands {a, b, c} are {T, T, F}.

Referring to the third row in [Table 4], a case corresponding to the special expression tree to which the tree transformation operation is applied is {a, b, c}={T, T, F}, and the step is a state of the tree transformation operation on the a node (Transform a). The controller 111 may not generate a test case for a special expression tree to which a tree transformation operation has been applied, or may generate a test case but not store it in the storage device 140.

In the special expression tree to which the tree transformation operation is applied, a path from the OR node, which is the root node, through the AND node, to the b node, which is the leaf node, is a flip feasibility path. The controller 111 may generate a third test case that performs a flip of the flip feasibility path from the special expression tree to which the tree transformation operation is applied. The special expression tree indicating the third test case is shown in FIG. 8D.

Figure 8D:
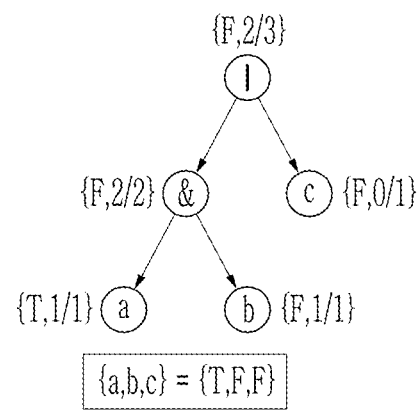

Referring to FIG. 8D, the OR node, the AND node, and the b node are flipped. Accordingly, the Boolean value of the OR node is changed to F and the number of flips is increased to 2 {F, 2/3}. The Boolean value of the & node is changed to F and the number of flips is increased to 2 {F, 2/2}. The Boolean value of the b node is changed to F and the number of flips is increased to 1 {F, 1/1}. The a node and the c node are the same as those in FIG. 8C.

In FIG. 8D, the Boolean values of the operands {a, b, c} are {T, F, F}.

Referring to the fourth row in [Table 4], the third test case is {a, b, c}={T, F, F}, and a step of the third test case is a state of the flip operation on the b node (Flip b). The controller 111 generates a third test case and may store the generated third test case in the storage device 140.

In third test case, a path from the OR node, which is the root node to the c node is a flip feasibility path. The controller 111 may generate a fourth test case that performs a flip of the flip feasibility path from the third test case. The special expression tree indicating the fourth test case is shown in FIG. 8E.

Figure 8E:
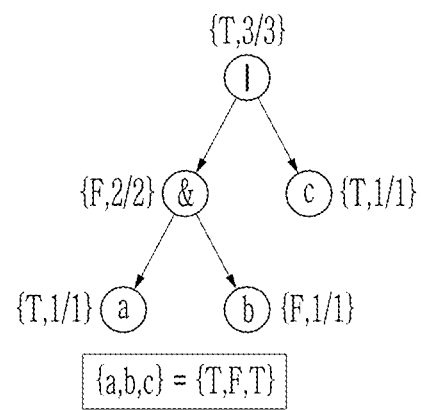

Referring to FIG. 8E, the OR node and the c node are flipped. Accordingly, the Boolean value of the OR node is changed to T and the number flips is increased to 3 {T, 3/3}. The Boolean value of the c node is changed to T and the number of flips is increased to 1 {T, 1/1}. The a node, the b node, and the AND node are the same as those in FIG. 8D.

In FIG. 8E, the Boolean values of the operands {a, b, c} are {T, F, T}.

Referring to the fifth row in [Table 4], the fourth test case is {a, b, c}={T, F, T}, and a step of the fourth test case is a state of the flip operation on the c node (Flip c). The controller 111 may generate a fourth test case and store the generated fourth test case in the storage device 140.

The controller 111 generated a total of four test cases: the first, second, third, and fourth test cases, and since all operands included in the special expression node flipped at least once, the step can be terminated by satisfying the termination condition.

As described above, the controller 111 may generate (n+1) test cases and execute them to analyze the source code.

When the controller 111 analyzes the source code through the (n+1) test cases, the input/output device 150 may output a code coverage result.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A code analysis method performed by a processor, the method comprising:
   converting an expression indicated by a source code to a Boolean expression, the expression including n conditions;
   generating a binary expression tree including a plurality of nodes based on the Boolean expression;
   initializing a flip limit and a number of flips of each of the plurality of nodes by analyzing whether each of the plurality of nodes is a leaf node of which a name is an operand or a parent node of which a name is an operator;
   generating a first test case by initialization Boolean values of each of a plurality of parent nodes each of which a name is an operator among the plurality of nodes and two child nodes of the plurality of parent nodes to one of a plurality of valid cases; and
   generating n test cases by performing a flip on all node having flip feasibility on a path from a root node to a leaf node of the binary expression tree based on the first test case, and storing the first test and the n test cases,
   wherein the flip is reversing the Boolean value of each corresponding node among the plurality of nodes, and the n is a natural number greater than or equal to 2.

2. The code analysis method of claim 1, wherein the plurality of valid cases include:
   a case that a Boolean value of an AND operator is true and two Boolean values of two operands are true;
   a case that the Boolean value of the AND operator is false, and one of the Boolean values of the two operands is true and the Boolean value of the other is false;
   a case that a Boolean value of an OR operator is false and two Boolean values of two operands are false; and
   a case that when the Boolean value of the OR operator is true, and one of the Boolean values of the two operands is true and the Boolean value of the other is false.

3. The code analysis method of claim 2, wherein the generating of the binary expression tree includes generating node data including a name, information on two child nodes, a Boolean value, a flip limit, and the number of flips corresponding to each of the plurality of nodes.

4. The code analysis method of claim 3, wherein the initializing of the flip limit and the number of flips of each of the plurality of nodes includes:
   setting the flip limit corresponding to each of a plurality of leaf nodes of which a name is an operand among the plurality of nodes to 1;
   setting a flip limit of each of the plurality of parent nodes to a sum of the two flip limits for two child nodes thereof; and
   setting the number of flips of each of the plurality of nodes to 0.

5. The code analysis method of claim 4,
   wherein the generating of the n test cases and the storing of the first test case and the n test case include determining whether a termination condition for the binary expression tree is satisfied, and
   wherein the termination condition is satisfied in response that a number of test cases generated for the binary expression tree is n+1, or the plurality of leaf nodes is flipped at least once.

6. The code analysis method of claim 5, further including:
   in response that the processor concludes that the termination condition is satisfied, storing the (n+1) generated test case including the first test case and the n test cases in a storage device.

7. The code analysis method of claim 5, further including:
   in response that the processor concludes that the termination condition is not satisfied,
   determining whether there is flip feasibility in each of the plurality of node while traversing the plurality of nodes; and
   determining whether there is a flip feasibility path in the binary expression tree based on the flip feasibility of each of the plurality of nodes.

8. The code analysis method of claim 7, further including:
   tree transformation for converting the binary expression tree in response that the processor concludes that there is no the flip feasibility path,
   wherein the tree transformation is first tree transformation for flipping a first node that cannot be flipped among the plurality of nodes of the binary expression tree and child nodes of the first node, or second tree transformation for flipping the first node of the binary expression node, child nodes of the first node, and parent nodes of the first node.

9. The code analysis method of claim 8, further including:
   generating a second binary expression tree by converting a first binary expression tree; and
   determining whether the second binary expression tree satisfies the termination condition.

10. The code analysis method of claim 7, wherein the determining of whether each of the plurality of nodes has flip feasibility includes:
    determining that a target node of which flip feasibility is to be determined has the flip feasibility in response that a Boolean value of each of a parent node of the target node and two child nodes of the parent node is one of the plurality of valid cases and a number of flips of the target node is less than the flip limit.

11. The code analysis method of claim 7, wherein the determining of whether there is the flip feasibility path in the binary expression tree includes:
    determining that there is the flip feasibility path in the binary expression tree in response that all nodes connected by trunk lines from a root node among the plurality of nodes to one of a plurality of leaf nodes among the plurality of nodes are capable of being flipped.

12. The code analysis method of claim 7, further comprising, in response that the processor concludes that there is the flip feasibility path, performing a flip on all nodes included in the flip feasibility path and updating the binary expression tree based on the flip.

13. The code analysis method of claim 12, further comprising generating a test case indicating a result of the flip.

14. The code analysis method of claim 12, further including:
generating a fourth binary expression tree by performing the flip on a third binary expression tree; and
determining whether the fourth binary expression tree satisfies the termination condition.

15. A code analysis apparatus comprising:
an input/output device receiving a source code;
a processor that is configured to generate a plurality of test cases for an expression represented by the source code and analyze codes, the expression including n conditions; and
a storage device storing the plurality of test cases,
wherein the processor comprises a controller that converts an expression to a Boolean expression, generates a binary expression tree including a plurality of nodes based on the Boolean expression, initialize a flip limit and a number of flips of each of the plurality of nodes by analyzing whether each of the plurality of nodes is a leaf node with an operand as a name thereof or an operator node with an operator as a name thereof, generates a first test case by initializing Boolean values of each of a plurality of parent nodes, of which a name is an operator among the plurality of nodes, and two child nodes of each of the plurality of parent nodes with one of a plurality of valid cases, generates n test cases by performing a flip on all nodes having flip feasibility on a path from a root node to a leaf node of the binary expression tree based on the first test case, and stores the first test case and the n test cases, and
wherein the flip is reversing the Boolean value of each corresponding node among the plurality of nodes, and the n is a natural number greater than or equal to 2.

16. The code analysis apparatus of claim 15, wherein the plurality of valid cases include:
a case that a Boolean value of an AND operator is true and two Boolean values of two operands are true;
a case that the Boolean value of the AND operator is false, and one of the Boolean values of the two operands is true and the Boolean value of the other is false;
a case that a Boolean value of an OR operator is false and two Boolean values of two operands are false; and
a case that when the Boolean value of the OR operator is true, and one of the Boolean values of the two operands is true and the Boolean value of the other is false.

17. The code analysis apparatus of claim 16, wherein the controller generates node data including a name, information on two child nodes, a Boolean value, a flip limit, and the number of flips corresponding to each of the plurality of nodes.

18. The code analysis apparatus of claim 17, wherein the controller sets the flip limit corresponding to each of the plurality of leaf nodes of which a name is an operand among the plurality of nodes to 1, sets a flip limit of each of the plurality of parent nodes to a sum of the two flip limits for two child nodes thereof, and sets the number of flips of each of the plurality of nodes to 0.

19. The code analysis apparatus of claim 18,
wherein the controller determines whether a termination condition for the binary expression tree is satisfied, and
wherein the termination condition is satisfied in response that a number of test cases generated for the binary expression tree is n+1, or the plurality of leaf nodes is flipped at least once.

20. The code analysis apparatus of claim 19, wherein in response that the termination condition is satisfied, the controller stores the (n+1) generated test case including the first test case and the n test cases in a storage device.

21. The code analysis apparatus of claim 19, wherein in response that the termination condition is not satisfied, the controller determines whether there is flip feasibility in each of the plurality of node while traversing the plurality of nodes, and determines whether there is a flip feasibility path in the binary expression tree based on the flip feasibility of each of the plurality of nodes.

22. The code analysis apparatus of claim 21, wherein in response that there is no the flip feasibility path, the controller flips a first node that cannot be flipped among the plurality of nodes of the binary expression tree and child nodes of the first node, or flips the first node of the binary expression node, child nodes of the first node, and parent nodes of the first node.

23. The code analysis apparatus of claim 22, wherein the controller generates a second binary expression tree by converting a first binary expression tree and determines whether the second binary expression tree satisfies the termination condition.

24. The code analysis apparatus of claim 22, wherein the controller determines that a target node of which flip feasibility is to be determined has the flip feasibility in response that a Boolean value of each of a parent node of the target node and two child nodes of the parent node is one of the plurality of valid cases and a number of flips of the target node is less than the flip limit.

25. The code analysis apparatus of claim 22, wherein the controller determines that there is a flip feasibility path in the binary expression tree in response that all nodes connected by trunk lines from a root node among the plurality of nodes to one of a plurality of leaf nodes among the plurality of nodes are capable of being flipped.

26. The code analysis apparatus of claim 22, wherein in response that there is the flip feasibility path, the controller performs a flip on all nodes included in the flip feasibility path and updates the binary expression tree based on the flip.

27. The code analysis apparatus of claim 26, wherein the controller generates a test case indicating a result of the flip.

28. The code analysis apparatus of claim 26, wherein the controller generates a fourth binary expression tree by performing the flip on a third binary expression tree, and determines whether the fourth binary expression tree satisfies the termination condition.

* * * * *